US010594596B2

(12) United States Patent
Scahill et al.

(10) Patent No.: US 10,594,596 B2
(45) Date of Patent: Mar. 17, 2020

(54) DATA TRANSMISSION (71) Applicant: British Telecommunications Public Limited Company, London (GB)

(72) Inventors: Francis Scahill, London (GB); Richard Evenden, London (GB); Simon Ringland, London (GB)

(73) Assignee: British Telecommunications Public Limited Company, London (GB)

( * ) Notice: Subject to any disclaimer, the term of this patent is extended or adjusted under 35 U.S.C. 154(b) by 132 days.

(21) Appl. No.: 15/562,302

(22) PCT Filed: Mar. 30, 2016

(86) PCT No.: PCT/EP2016/056952
§ 371 (c)(1),
(2) Date: Sep. 27, 2017

(87) PCT Pub. No.: WO2016/156425
PCT Pub. Date: Oct. 6, 2016

(65) Prior Publication Data
US 2018/0254979 A1 Sep. 6, 2018

(30) Foreign Application Priority Data
Mar. 30, 2015 (EP) ..................................... 15161781

(51) Int. Cl.
*H04L 12/707* (2013.01)
*H04L 12/721* (2013.01)
(Continued)

(52) U.S. Cl.
CPC .............. *H04L 45/24* (2013.01); *H04L 45/70* (2013.01); *H04L 47/14* (2013.01); *H04L 47/193* (2013.01);
(Continued)

(58) Field of Classification Search
CPC .......... H04L 45/24; H04L 69/14; H04L 47/14; H04L 45/22; H04L 45/70; H04L 47/193; H04W 16/14; H04W 88/16
See application file for complete search history.

(56) References Cited

U.S. PATENT DOCUMENTS 6,947,379 B1 * 9/2005 Gleichauf ............... H04L 45/00
370/229
2005/0147049 A1 7/2005 Ganesan
(Continued)

FOREIGN PATENT DOCUMENTS

EP 2709418 A2 3/2014
WO WO 2008/066928 A2 6/2008
(Continued)

OTHER PUBLICATIONS

U.S. Appl. No. 15/561,450, filed Sep. 25, 2017, Inventor(s): Ringland et al.
(Continued)

Primary Examiner — Pao Sinkantarakorn
Assistant Examiner — Kabir U Jahangir
(74) Attorney, Agent, or Firm — Patterson Thuente Pedersen, P.A.

(57) ABSTRACT

In Multipath Transport Layer Protocol (MPTCP) data transmission, data packets are sent from a transmitter to a receiver over at least two data paths, for example using a cellular data connection and a wireless network data connection. An apparatus located at a common point in the data paths is used to monitor the characteristics of any data flows in a MPTCP connection and to manipulate the packet characteristics of the data flows to ensure the MPTCP performance matches a predetermined data distribution target.

9 Claims, 10 Drawing Sheets (51) Int. Cl.
  *H04L 12/801* (2013.01)
  *H04L 29/06* (2006.01)
  *H04W 16/14* (2009.01)
  *H04W 88/16* (2009.01)

(52) U.S. Cl.
  CPC ............. *H04L 69/14* (2013.01); *H04W 16/14* (2013.01); *H04W 88/16* (2013.01)

(56) References Cited

U.S. PATENT DOCUMENTS

| | | |
|---|---|---|
| 2007/0104218 A1 | 5/2007 | Hassan et al. |
| 2010/0118842 A1 | 5/2010 | Kalhan |
| 2012/0188949 A1 | 7/2012 | Salkintzis et al. |
| 2012/0226802 A1* | 9/2012 | Wu ............... H04L 1/1825 709/224 |
| 2013/0083661 A1 | 4/2013 | Gupta et al. |
| 2013/0329714 A1 | 12/2013 | Fan et al. |
| 2014/0241316 A1 | 8/2014 | Okmyanskiy et al. |
| 2014/0293959 A1* | 10/2014 | Singh ............. H04W 36/0016 370/331 |
| 2014/0341023 A1 | 11/2014 | Kim et al. |
| 2014/0369329 A1 | 12/2014 | Lee et al. |
| 2015/0016249 A1* | 1/2015 | Mukundan ......... H04L 47/125 370/230 |
| 2016/0212755 A1* | 7/2016 | Cao ................. H04W 40/12 |
| 2017/0134261 A1* | 5/2017 | Seo ................. H04L 12/66 |
| 2018/0109998 A1 | 4/2018 | Ringland et al. |

FOREIGN PATENT DOCUMENTS

| | | |
|---|---|---|
| WO | WO 2012/166671 A1 | 12/2012 |
| WO | WO 2013/006199 A1 | 1/2013 |
| WO | WO 2013/176588 A1 | 11/2013 |
| WO | WO 2016/156430 A1 | 10/2016 |
| WO | WO 2016/156436 A1 | 10/2016 |
| WO | WO 2016/156439 A1 | 10/2016 |

OTHER PUBLICATIONS

U.S. Appl. No. 15/562,229, filed Sep. 27, 2017, Inventor(s): Ringland et al.
U.S. Appl. No. 15/562,847, filed Sep. 28, 2017, Inventor(s): Ringland et al.
International Preliminary Report on Patentability, Application No. PCT/EP2016/056952, dated Oct. 3, 2017, 9 pages.
International Search Report & Written Opinion, Application No. PCT/EP2016/056952, dated May 5, 2016, 12 pages.
"Small Cell Forum Ltd Integrated Fem to-WiFi (IFW) Networks", Feb. 28, 2012 (Feb. 28, 2012), XP055145624, Retrieved from the Internet at: http://www.smallcellforum.org/smallcellforum_resources/pdfsend01.php?file=lntegrated-Femto-WiFi-Networks-WhitePaper_sm.pdf.
International Preliminary Report on Patentability, Application No. PCT/EP2016/056970, dated Oct. 3, 2017, 14 pages.
International Search Report, Application No. PCT/EP2016/056970, dated Jun. 9, 2016, 17 pages.
International Preliminary Report on Patentability, Application No. PCT/EP2016/056958, dated Oct. 3, 2017, 8 pages.
International Search Report and Written Opinion, Application No. PCT/EP2016/056958, dated Jun. 1, 2016, 12 pages.
3rd Generation Partnership Project (3GPP TR 37.870 V0.5.0); Technical Specification Group Radio Access Network; Study on Multi-RAT joint coordination (Release 13). 650. Route Des Lucioles; F-06921 Sophia-Antipolis Cedex; France. Feb. 2015. pp. 1-22.
International Preliminary Report on Patentability, Application No. PCT/EP2016/056967, dated Oct. 3, 2017, 9 pages.
International Search Report and Written Opinion, Application No. PCT/EP2016/056967, dated Jun. 10, 2016, 13 pages.
Kobayashi, et al.; Internet Engineering Task Force (IETF); IP Flow Information Export (IPFIX) Mediation: Framework; ISSN: 2070-1721; Apr. 2011; 29 pages.
Raiciu, et al.; Internet Engineering Task Force (IETF); Coupled Congestion Control for Multipath Transport Protocols; ISSN: 2070-1721; Oct. 2011; 12 pages.
Ford, et al.; Internet Engineering Task Force (IETF); TCP Extensions for Multipath Operation with Multiple Addresses; ISSN: 2070-1721; Jan. 2013; 64 pages.
Simsek et al.; IEEE ICC 2013—Wireless Communications Symposium; "Rethinking Offload: How to Intelligently Combine WiFi and Small Cells?"; 978-1-4673-3122-7/13; pp. 5204-5208 (5 pages total).
Elsherif et al.; IEEE ICC 2013—Wireless Communications Symposium; "Adaptive Small Cell Access of Licensed and Unlicensed Bands" 978-1-4673-3122-7/13; pp. 6327-6332 (6 pages total).
Small Cell Forum; Release Four; Document 033.04.01 "Integrated Femto-WiFi (IFW) Networks"; Dec. 1, 2013; www.smallcellforum.org; 37 pages.

* cited by examiner

DATA TRANSMISSION

CROSS-REFERENCE TO RELATED APPLICATIONS

The present application is a National Phase entry of PCT Application No. PCT/EP2016/056952, filed on 30 Mar. 2016, which claims priority to EP Patent Application No. 15161781.8, filed on 30 Mar. 2015, which are hereby fully incorporated herein by reference.

FIELD

The present disclosure relates to data transmission and in particular for a method and apparatus for manipulating data flows travelling across different transmission paths.

BACKGROUND

In data networking, the Transmission Control Protocol (TCP) is a widely used transport layer network protocol for reliable data transmission and reception between two or more network devices. In TCP, data packets are acknowledged by the receiver so that the transmitter knows that the packets are received and can also retransmit any packets which are not received by the receiver.

The layered network model allows the different aspects of networks to be managed efficiently. The higher network layers such as the application layer are concerned with data sessions between network entities without having to worry about how the data actually gets to the other side. The lower network layers are concerned with delivery of the data packets and not their contents.

The Transport Control (TCP) Layer is a transport layer protocol located higher than the physical and data link layer but lower than the application layer. It is concerned with ensuring reliable delivery of data packets from a sender to receiver. TCP supports in packet reordering and retransmission of lost or corrupted data packets.

In TCP, the application layer payload is split between one or more TCP packets, each packet has a sequence number and the receiver is configured to acknowledge receipt of each packet so that the transmitter knows which packets have been successfully received. The receiver will determine whether any packets have been lost or corrupted and using explicit NACK responses, or inferring that a packet has been lost because an ACK response is not received, the transmitter will re-transmit missing packets.

Since the transmitter does not send new packets until the earlier transmitted packets are acknowledged, the TCP layer also allows a receiver to throttle a transmitter when the transmitter is sending packets at a greater rate than the receiver can receive packets into its receiver buffers.

TCP also includes flow control mechanisms so that data can be transmitted as quickly as possible without overwhelming the receiver so as to maintain a reliable connection. A Receiver Window Size (RWND) field is used by the receiver to indicate to the sender the amount of data that it is able to accept. The window size has an initial value but can change to a calculated value based on the bandwidth of a data link between the transmitter and receiver, and the round trip time (RTT). In addition, a TCP congestion control mechanism governs the behavior of the TCP data session in response to factors indicative of congestion on the data link. To avoid adding to a congested link, TCP is arranged to rapidly scale back the transmission rate of the transmitter when congestion is detected. Once the link conditions have improved, TCP will increase the transmission rate in accordance with a congestion policy such as Slow-Start, Congestion-Avoidance, Fast Recovery and Fast-Retransmit.

In recent times, in order to further improve resilience of a data connection between a transmitter and a receiver and to take account of other developments in data networking systems, Multi Path TCP (MPTCP) has been developed to allow data packets to take different data paths from a transmitter to a receiver. Since packets may arrive in a different order to the transmission order, receiver buffers are required to re-order the packets before delivery to an application layer.

One such multi path scenario is in the case of a mobile device having both WiFi and cellular connectivity such as LTE. Data packets can be transmitted from the mobile device using either the WiFi or LTE data paths to a destination. Furthermore, MPTCP can decide to send some packets via the WiFi interface and other packets via the cellular interface. The decision relating to which interface is used is dependent on the data path characteristics such as latency, packet loss and window size.

A problem with MPTCP is that it assumes that each data path is equally valid and therefore the selection of a path is only dependent on the data link characteristics. However, in some cases it is advantageous to bias the traffic towards a particular data path.

SUMMARY

The present disclosure addresses this issue.

In one aspect, an embodiment of the present disclosure provides a method of controlling data packet transmission from a sender device to a receiver via a plurality of data paths in accordance with a multi-path data transmission protocol, the method comprising a device, located on a common part of a data network carrying both data paths between said sender and receiver, carrying out the following: identifying data sub-flows belonging to the same data packet transmission; monitoring characteristics of the data sub-flows to the receiver; modifying transmission properties of data packets in the sub-flows so that the proportion of data packets flowing across each of the plurality of data paths meets a predetermined target distribution.

In another aspect, an embodiment of the present disclosure provides an apparatus for controlling data packet transmission from a sender device to a receiver via a plurality of data paths in accordance with a multi-path data transmission protocol, the method comprising a device, located on a common part of a data network carrying both data paths between said sender and receiver, carrying out the following: identifying data sub-flows belonging to the same data packet transmission; monitoring characteristics of the data sub-flows to the receiver; modifying transmission properties of data packets in the sub-flows so that the proportion of data packets flowing across each of the plurality of data paths meets a predetermined target distribution.

FIGURES

Embodiments of the present disclosure will now be described with the aid of the accompanying figures in which:

FIG. 9 is a schematic showing the functional components of a sub-flow controller in the controller component.

DESCRIPTION

Figure 1:
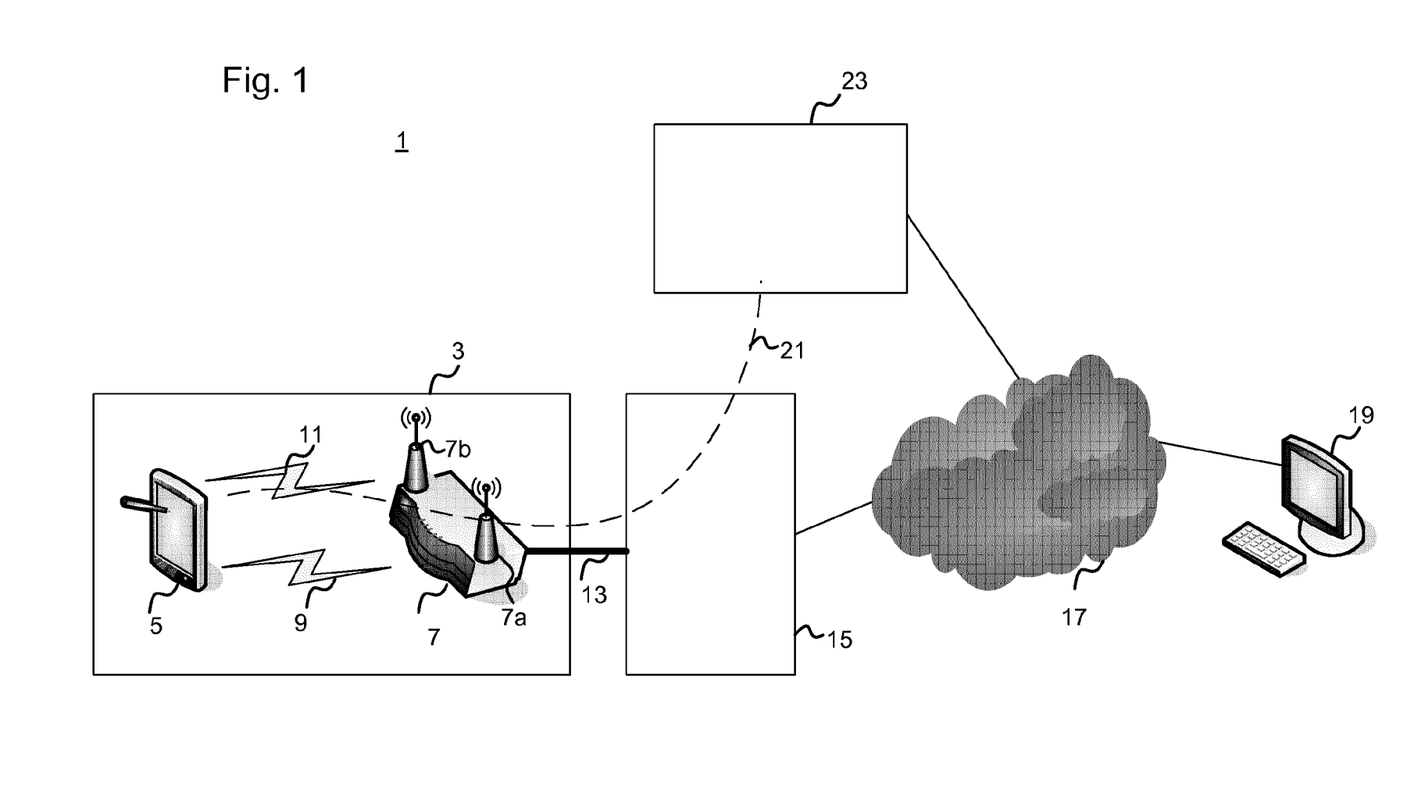
FIG. 1 is a schematic overview of a data transmission system in a first embodiment.

FIG. 1 provides an overview of a data network 1 in accordance with the first embodiment. Within a user premises 3 such as a home or office environment, a mobile device 5 such as a mobile phone, tablet or laptop is shown connected to an integrated wireless access point and femtocell router 7, hereinafter referred to as a hub 7.

The hub 7 contains a WiFi access point 7a which generates and maintains a wireless local area network (WLAN) in accordance with a WiFi protocol such as IEEE 802.11ac for a surrounding area, such as the user premises 3, to enable the mobile device 5 to connect and communicate with the hub 7 via the WLAN.

The hub 7 also contains a short range, cellular access point 7b such as a small cell device (the term covers picocells and femtocells) which provides LTE data connectivity to the user device 5 within a small zone around the hub 7. For ease of explanation, the range of the cellular access point 7b is assumed to be limited to the extent of the user premises 3.

The mobile device 5 therefore has data connections to the hub 7 via two types of wireless protocol, in this case wireless local area network data link 9 and cellular network data link 11.

The hub 7 generally functions as a routing device for data transfer between any connected local devices 5 and also connects those devices 5 to resources on wide area networks such as the Internet 17. The hub contains a wide area network interface, in this embodiment, an xDSL modem for communication over a copper and/or optical fiber link 13 to an ISP core network 15 which itself provides links to wide area network 17 resources such as the Internet and correspondent nodes 19 such as video servers, file servers and other users, etc.

The ISP core 15 contains the terminators for the copper/fiber link 13 and functionality to connect the hub 7 data sessions to resources available on wide area networks such as the Internet 17. Billing and user authentication is also handled by the ISP core 15.

Although the WiFi link 9 and LTE link 11 are both wireless links from the mobile device 5 to the hub 7, the onward processing of data packets within those links is handled differently. For WiFi, the packets are forwarded to the ISP core 15 which is responsible for forwarding the data to a packet destination, such as the correspondent node 19 via the Internet 17.

In contrast, the cellular access point 7b has similar functionality to a short range cellular network macrocell and therefore a mobile device 5 will link to the cellular access point 7b in accordance with standard LTE handover and idle mode reselection procedures. The cellular access point 7b maintains a data tunnel 21, for example using Generic Routing Encapsulation (GRE) and IPSec, to a cellular network core 23. Data packets from the mobile device 5 travel via the LTE link 11 to the cellular access point 7b and then through the tunnel 21 via the hub 7 and the ISP core 15 to the cellular network core 23 which is responsible for routing data to the Internet 17 and correspondent node 19.

As a result, there are two logically separate data paths between the mobile device 5 and the correspondent node 19 and data packets in the paths will both travel through the hub 7 and the network core 15 but then take different paths.

A conventional mobile device 5 will only use one interface at a time, i.e. only the WiFi link 9 or only the LTE link 11. Furthermore, the standard behavior is that if WiFi functionality is enabled on the mobile device 5 and a valid WiFi network is available, then the mobile device 5 will use the WiFi link 9 in preference to the LTE link 11. The LTE function is usually disabled on the mobile device to save power.

Regardless of the data link selected, data to be transmitted by an application of the mobile device 5 will generally be transmitted as Internet Protocol (IP) packets using Transport Control Protocol (TCP) to provide reliable host-to-host connectivity to the correspondent node 19 such that any transmitted packets are reliably delivered to the receiver, and that the packets are delivered in order. Data transmitted from the correspondent node 19 back to the mobile device 5 is also sent in the same manner.

MPTCP

In recent times, Multipath TCP (MPTCP) has been developed to allow packets to be transmitted over two or more data links and also for the transmitted packets to be reordered into the correct sequence as transmitted. MPTCP is specified in RFC 6183 and RFC 6824, both incorporated herein by reference. For example, for the mobile device 5 having both a WiFi interface and a LTE interface, rather than sending the entire set of packets for a data session via just the WiFi interface or the LTE interface, packets can be sent using both the WiFi interface and the LTE interface at the same time. Improved buffer management at the receiver, the correspondent node 19, allows the two separate streams of packets to be reconstructed into the original sequence.

In the first embodiment the mobile device 5 and correspondent node 19 each have a modified TCP interface so that data packets can be transmitted using both the WiFi and LTE at the same time.

Figure 2:
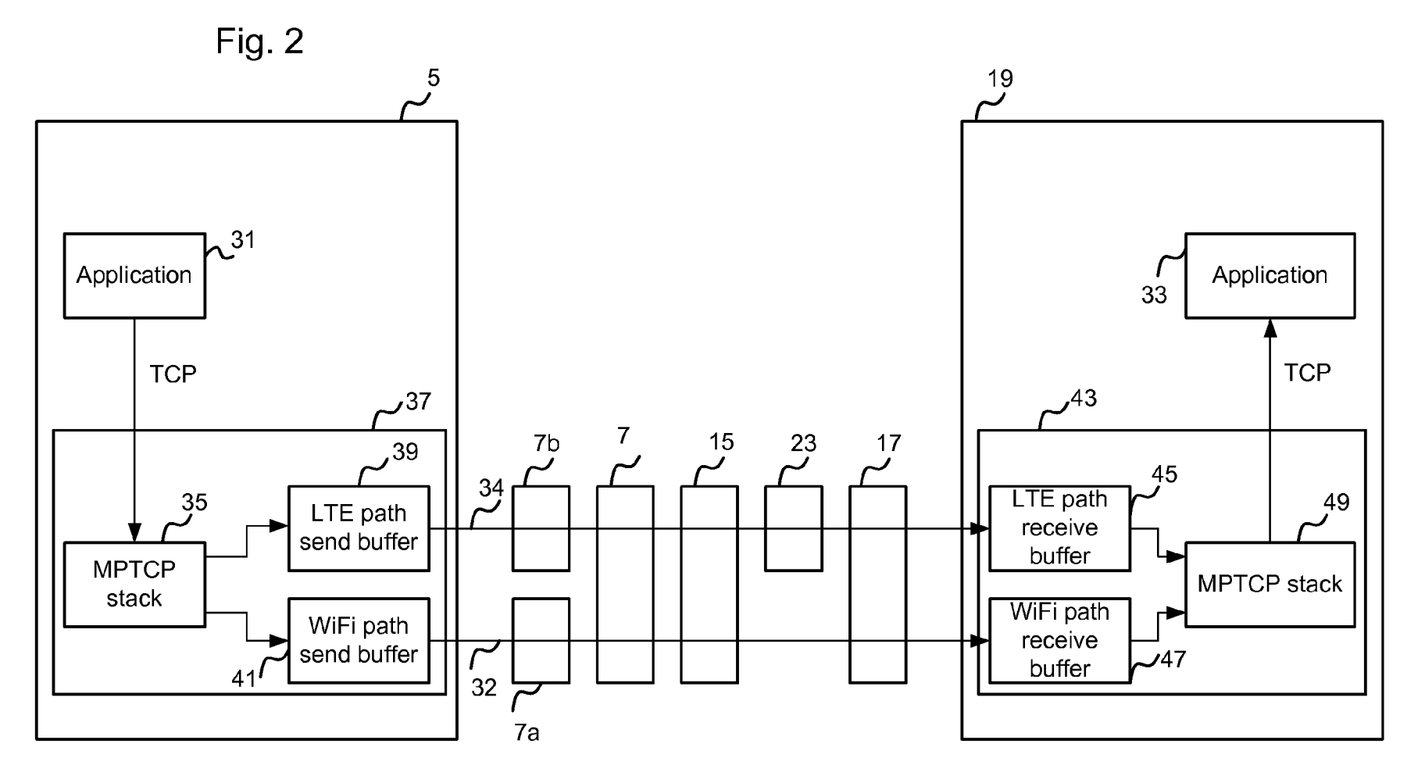
FIG. 2 is an alternative view of the data transmission system showing multipath TCP.

FIG. 2 shows an alternative view of the system in FIG. 1 to show the MPTCP connection.

At the application layer, a first application 31 at the mobile device 5 is shown sending data to a second application 33 at the correspondent node 19. The second application 33 has constructed a TCP listen socket with an IP address of the correspondent node 19 and a specified port number.

To start sending data, the first application 31 connects to the application 33 socket by constructing its own socket specifying the correspondent node's IP address and port number. A MPTCP stack 35 in a virtual combined network interface 37 of the mobile device 5 initiates a first TCP sub-flow 32 for the connection using either the WiFi or LTE path, however, it also automatically initiates a second TCP sub-flow 34 over the other data path.

Once the TCP paths have been established, the MPTCP stack 35 is responsible for deciding and scheduling how to divide the transmission of packets between the different paths in accordance with RFC 6356. Data packets are placed into a LTE path send buffer 39 and a WiFi path send buffer 41 respectively for transmission to a virtual combined network interface 43 of the correspondent node 19.

As explained earlier, the packets in the LTE send buffer 39 will traverse the cellular access point 7b, the hub 7, the ISP core 15, the cellular network core 23 and the Internet 17 on the way to the correspondent node 19.

In contrast, the packets in the WiFi send buffer 41 will take a simpler path and traverse the WiFi access point 7a, the hub 7, the ISP core 15 and the Internet 17 to arrive at the correspondent node 19.

Whichever network path the packets take, when they arrive at the virtual combined network interface 43 of the correspondent node 19, LTE path packets are stored at a LTE path receive buffer 45 and WiFi path packets are stored in a WiFi path receive buffer 47. A MPTCP stack 49 of the corresponding node 19 in a receive mode reorders the packets in the buffers 45, 47 into the correct sequence and then delivers the application layer data to the application 33.

Note that, for ease of explanation only the transmission of data from the mobile device 5 to the correspondent node 19 is described. However similar buffers and MPTCP processing is present for data packets travelling from the correspondent node 19 to the mobile device 5.

Furthermore, there can be multiple TCP sub-flows over each path for a single MPTCP connection.

Advantageously, MPTCP presents a regular TCP interface to applications so that the operation of the multiple interfaces is transparent to the applications. In this way, MPTCP enables more efficient resource utilization, efficient throughput and a smoother reaction to failures.

Figure 3:
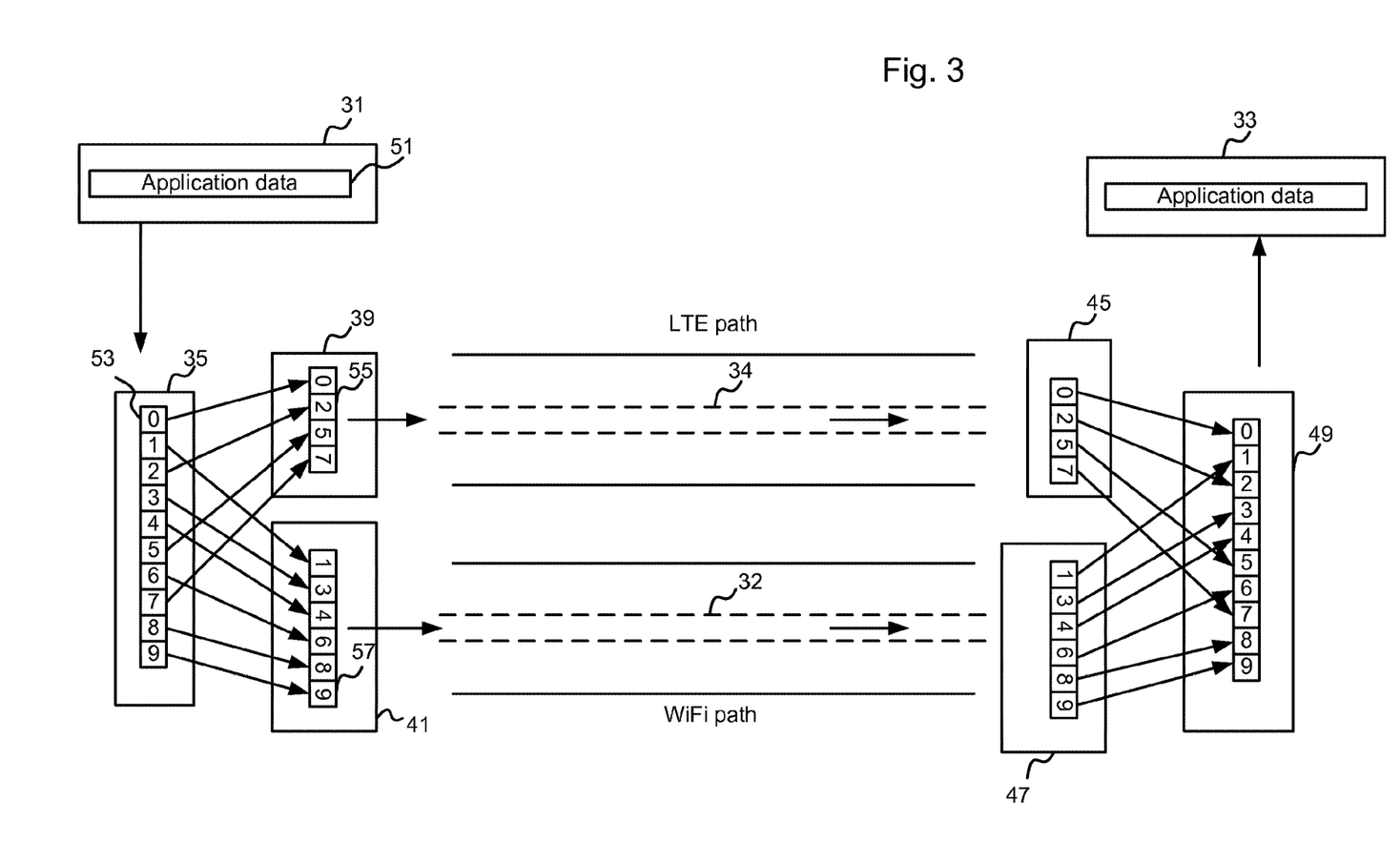
FIG. 3 shows the operation of the MPTCP stack in allocating packets to sub-flow data paths.

FIG. 3 shows a more detailed example of application data 51 being transmitted from an application 31, running on the mobile device 5, to an application 33 hosted by the correspondent node 19.

The application data 51 is passed to the MPTCP stack 35 in the virtual combined network interface 35 which splits the application data 51 into a set of ordered data packets 53, each having addressing information and a part of the original application data 51 in the packet data payload, suitable for transmission. The MPTCP stack 35 then allocates the sequence of data packets to the LTE send buffer 39 and the WiFi send buffer 41 in accordance with a pre-stored MPTCP scheduler algorithms.

The scheduler decision, i.e. the assignment of a data packet to a sub-flow is be based on several variables, for example, the capacity of the sub-flow or the delay of packets travelling along the sub-flow. Although different MPTCP stacks may implement different schedulers, most schedulers will use sub-flow capacity and or sub-flow delays in the scheduling decision.

In this example, a first subset of packets 55, containing packet numbers 0, 2, 5 and 7, is assigned to the LTE send buffer 39, while a second subset of data packets 57, containing packet sequence numbers 1, 3, 4, 6, 8 and 9, is assigned to the WiFi send buffer 41. Extended to a larger set of packets, in accordance with this example, the MPTCP scheduler will allocate 40% of the data packets to the LTE path and 60% of the data packets to be transmitted to the WiFi path.

The first subset of packets 55 are transmitted along the overall LTE path in a TCP sub flow 34, while the second subset of packets 57 are transmitted along the overall WiFi path in a TCP sub flow 32.

Although the different paths may result in the subsets of packets 55, 57 arriving at different times due to routing path differences, the sub-sets of packets are received at the respective LTE receive buffer 45 and the WiFi receive buffers 47 within the combined virtual network interface 43 of the correspondent node 19.

The MPTCP stack 49 of the correspondent node 49 then reorders the packets in each sub-set of packets 55, 57 stored in the LTE receive buffer 45 and the WiFi receive buffer 47 and extracts the application data to present to the application 33.

Note that each TCP sub flow 32, 34 is a reliable transport layer link and therefore the packets in each sub-flow are delivered reliably and in the order they were transmitted.

A similar process occurs for data transmitted from the application 33 at the correspondent node 19 to the application 31 of the mobile device 3.

FIG. 3 only shows a single sub flow 32, 34 in each of the LTE and WiFi paths, however the depending on the bandwidth characteristics of the different paths, multiple sub-flows can be created for a single MPTCP connection.

In accordance with the RFC6182 and RFC 6824, the allocation of packets between each subset by the MPTCP stack is influenced by the network characteristics and performance of each data link. Therefore the above 40:60 split in allocation will remain in effect whilst the network conditions are the same.

Figure 4:
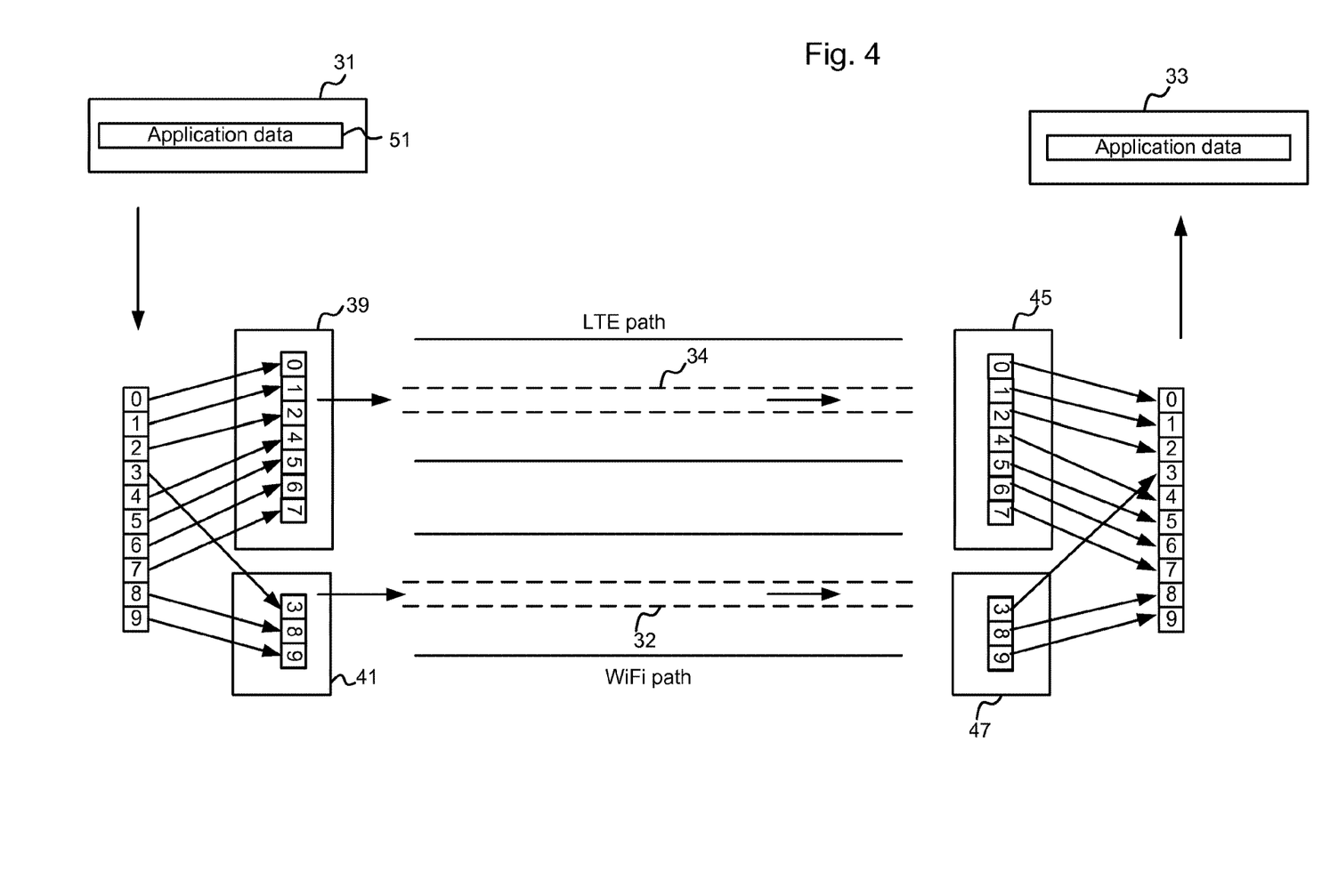
FIG. 4 shows the operation of the MPTCP stack in an alternative allocation of packets to sub-flow data flows under different network conditions.

FIG. 4 shows an example of the allocation of data packets when network conditions have changed and the effect it has on the operation of the MPTCP stack 35.

In FIG. 4, the application data is packetized by the MPTCP stack 35 and due to an improvement in the LTE path or a deterioration of the WiFi path, subsets are allocated such that packets 0, 1, 2, 4, 5, 6 and 7 are grouped into a subset in the LTE send buffer 39 and packets 3, 8 and 9 are grouped into a subset in the WiFI send buffer 41. Once the subsets of packets are received into the LTE receive buffer 45 and WiFi receive buffer 47 of the correspondent node 19, the MPTCP stack 49 of the correspondent node 19 recreates the original sequence and forwards the application data payload to the application 33.

In the example network conditions, 70% of the packets are sent via the LTE path and 30% of packets are sent via the WiFi path.

With the standard MPTCP processing, the distribution of data packets to a particular data path is related to the network path performance and characteristics of the data paths. Therefore without a modification to the default scheduler algorithms, MPTCP will use whichever combination of links provide the best performance regardless of other criteria.

Whilst changes to the default MPTCP protocol behavior would be difficult to implement across all devices, it is nevertheless often desirable to maintain a bias for one network path over another. For example a user of the mobile device, an Internet Service Provider or Mobile Network Operator may prefer use of WiFi instead of LTE regardless of the network conditions.

To address this, in the embodiment, a control function of the hub 7 which is located on the data pathway for both WiFi and LTE traffic is configured to monitor the data packet distribution assigned by MPTCP and to modify the packet flow metrics of each sub-flow reported back to the sender, in order to manipulate the standard MPTCP behavior to reallocate packets in accordance to a new target distribution.

In particular, the traffic shaping modifications involve actually changing the properties of the sub-flows by delaying, dropping or modifying the Window Size in data packets within the sub-flows to alter the deemed sub-flow capacity, round trip times (RTT) and delay.

The various components involved in the modified MPTCP system will now be described.

Figure 5:
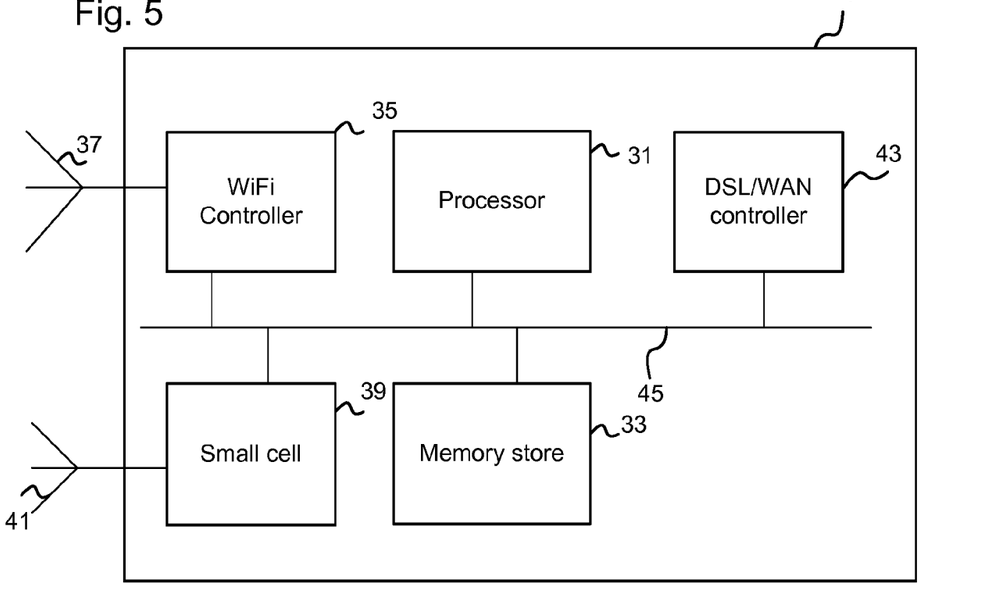
FIG. 5 is a schematic showing the physical components of a hub device.

FIG. 5 shows the physical components of a hub 7 device according to the first embodiment. As shown the hub 7 has a central processor 31 for controlling the overall operation of the hub in accordance with processing instructions stored in a memory store 33 which is a combination of Random Access Memory (RAM) and also Read Only Memory (ROM).

For connectivity with external devices, the hub also includes wireless and wired network interfaces. A WiFi controller 35 and a WiFi antenna 37 provides wireless local area network (WLAN) connectivity and in this embodiment, a small cell controller 39 and LTE antenna 41 are integrated into the hub 7 for providing cellular network access.

The hub 7 also includes a wide area network controller 43, in this embodiment, a Very High bit-rate Digital Subscriber Line (VDSL) modem which provides connectivity to wide area networks such as the Internet and ISP core services over a copper twisted pair. The components are all interconnected via an internal data bus 45.

When computer instructions stored in the working memory 33 are executed by the processor 31, the hub 7 can be regarded as a number of functional units involving a combination of hardware and software processing.

Figure 6:
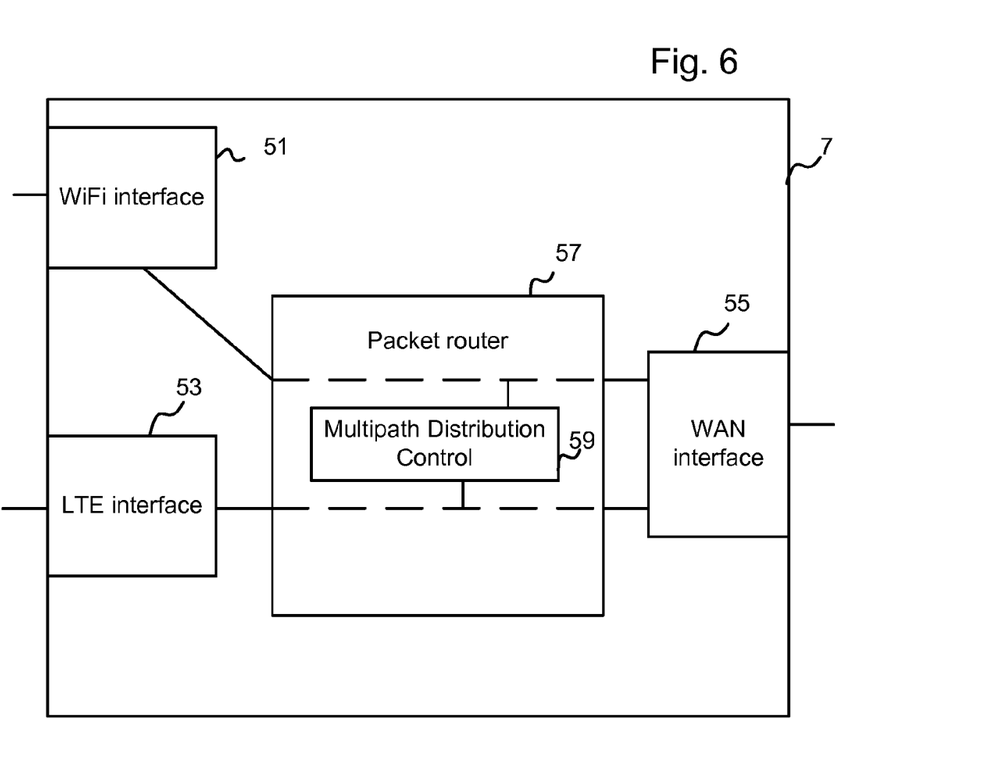
FIG. 6 is a schematic showing the functional components of the hub device.

FIG. 6 shows the functional units of the hub 7 when the processor executable instructions stored in the working memory 33 are being executed by the processor 31 and the physical components are configured in accordance with the first embodiment.

The hub 7 includes a WiFi interface 51 for sending and receiving data packets from WLAN devices using 802.11ac data protocol. A LTE interface 53 is configured to send and receive data packets to/from cellular devices in communication with the hub 7. For wired communication, the hub also has WAN interface 55 for wired communication with external networks.

To connect and coordinate the flow of data packets between the network interfaces, the hub 7 includes a packet routing function 57 which is responsible for inspecting the header information of each incoming packet from any of the interfaces, determining the destination of the packet and forwarding each packet to the appropriate network interface 51, 53, 55 for delivery to the destination.

In the first embodiment, the hub 7 includes a multipath distribution control function (MDCF) 59 in order to control the behavior of any MPTCP flows across the packet routing function 57 and the various network interfaces 51, 53, 55, in particular the distribution of the MPTCP flow packets using the two wireless interfaces of the hub 7: WiFi interface 51 and the LTE interface 53. The MDCF 59 controls the behavior using a negative feedback loop.

Figure 7:
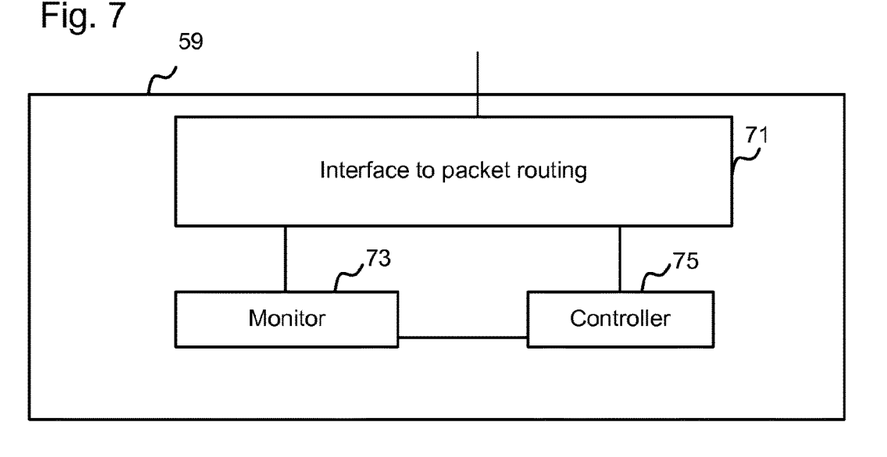
FIG. 7 is a schematic showing the functional components of a multi-path distribution control function.

FIG. 7 shows the functions of the MDCF 59. The MDCF 59 includes a routing interface 71 to packet routing function 57, a monitor 73 for monitoring the performance of the TCP sub flows flowing through the hub 7 and determining a traffic shaping policy to apply in order to implement a desired traffic distribution, and a controller 75 for implementing the determined traffic shaping policy by altering the packet flow information of each sub-flow.

The monitor 73 is responsible for detecting the presence of, and monitoring the characteristics of MPTCP flows and determining how the flow characteristics can be modified to cause the default MPTCP protocols to change the distribution of packets being allocated to the LTE path and the WiFi path.

The monitor listens for various dynamic inputs such as:
  LTE radio access status (e.g. utilization, signal strength etc)
  WiFi Radio access status (utilization and signal strength)
  Core network status
  MPTCP TCP sub-flow sessions, Deep Packet Inspection data etc from the LTE data path
  MPTCP TCP sub-flow session DPI data etc from the WiFI data path.

The monitor can also listen for static or external configured parameters such as:
  LTE core transit costs
  WiFi core transit costs
  Device power consumption considerations
  IP flow distribution
  Traffic distribution algorithm.

In summary, the monitor 73 carries out the following functions:
  Gather the dynamic, static and externally configured inputs
  Analyze the data
  Calculate a desired distribution of traffic over the LTE and WiFi paths for each MPTCP connection based on the line conditions
  Determine the traffic shaping policies required to implement the desired traffic distribution
  Signal the control process to implement the determined traffic shaping policy.

Figure 8:
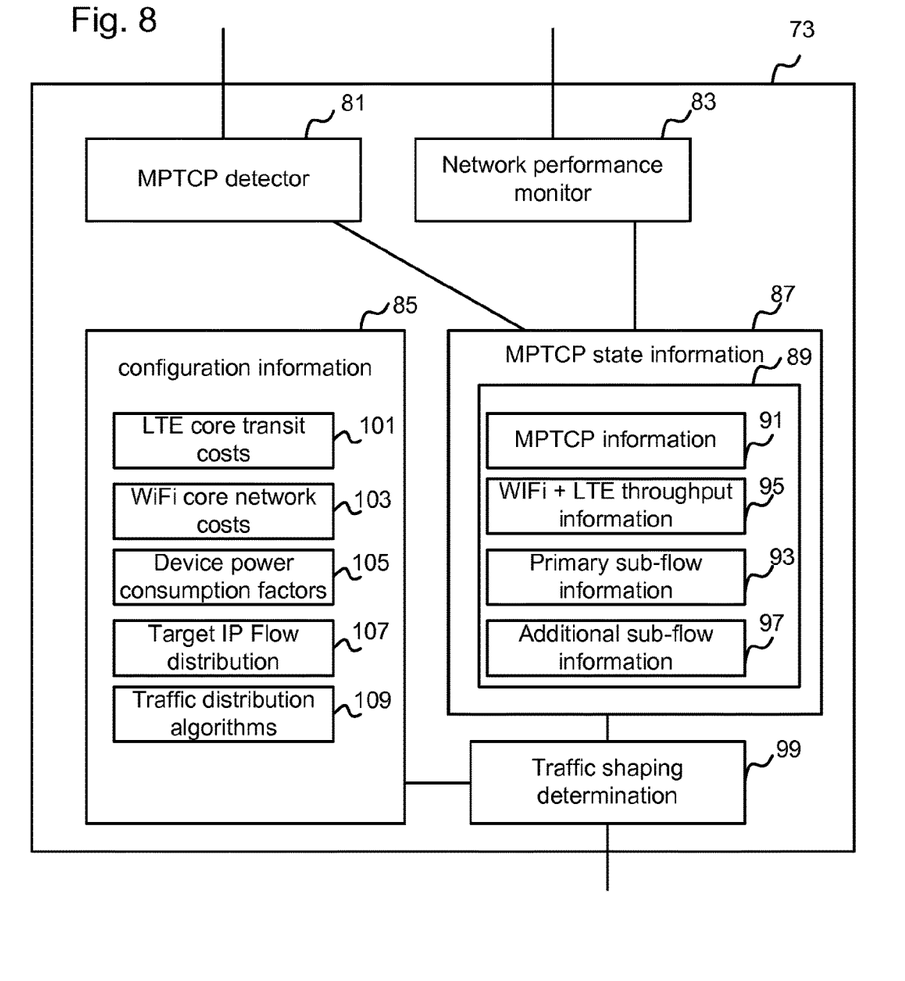
FIG. 8 is a schematic showing the functional components of a monitor component of the multi-path distribution control function.

FIG. 8 shows the components of the monitor 73. The monitor 73 must be able to read, measure and classify MPTCP traffic as the data packets traverse the hub. The monitor 73 includes an MPTCP detector 81, a network performance monitor 83, a configuration file 85 and a MPTCP state information store 87.

The MPTCP detector 81 monitors traffic flowing through the packet routing function 57 and listens for new MPTCP sessions, for example from the mobile device 5 to the correspondent node 19 and once detected, extracts information about the MPTCP connection.

In Linux based systems this can be achieved by using the nfnetlink library or the pcap library which allows the MPTCP detector 81 of the monitor 73 to communicate with the Linux kernel routing functions. This routes IP traffic passing through the Linux kernel through to the MPTCP detector 81 for processing.

The creation of an MPTCP connection begins with a TCP SYN message which contains MPTCP specific TCP options in the TCP header. The MPTCP detector 81 can identify a new MPTCP connection being established by listening for the MP_CAPABLE handshake. On detection of a new MPTCP connection, the MPTCP detector 81 will create a new MPTCP connection state record 89 in the MPTCP state information store 87. The created connection state record 89 contains several variables, a MPTCP key variable 91 containing the relevant sender and receiver keys and a primary sub-flow variable 93 containing a 5-tuple relating to the primary sub-flow.

The MPTCP detector 81 and network performance monitor 83 then populate the MPTCP connection state record 89 with further measured metric information including a WiFi and LTE throughput information variable 95 and information on further sub-flows 97.

Each MPTCP connection state record 89 will hold:
Mptcp Information:
MPTCP sender's key;
MPTCP receiver's key;
WiFi and LTE throughput information
WIFi path measured throughput (across all WiFi sub-flows associated with MPTCP connection)
LTE path measured throughput (across all LTE sub-flows associated with MPTCP connection)
Measured throughput ratio
Target throughput ratio
Primary (i.e. initial subflow information)
Path: LTE or WiFI
Path measured throughput for this sub-flow
RTT as seen by source
RTT as seen by destination
5-tuple: <Source IP Address>, <Source Port>, <Destination IP Address>, <Destination port>, Protocol: TCP>
Additional sub-flow information (one entry for each sub-flow)
Path: LTE or WiFI
Path measured throughput for this sub-flow
RTT as seen by source
RTT as seen by destination
5-tuple: <Source IP Address>, <Source Port>, <Destination IP Address>, <Destination port>, Protocol: TCP>

The throughput information is gathered from the various network interfaces of the hub 7 such as the wireless access point 7a, the cellular access point 7b, the wide area network interface by the network performance monitor 83.

The association of a new sub-flow with an existing MPTCP connection can be detected by the MPTCP detector 81 listening for packets with the MP-JOIN TCP flag set. On detection of a new sub-flow, the MPTCP detector 81 can find the relevant MPTCP connection state record 89 and update it by adding a 5-tuple for the new sub-flow. In this way, the MPTCP connection state record 89 stores identify information regarding which TCP sub-flows belong to which MPTCP connections and also which path the sub-flows transit.

Once the MPTCP sub flows and throughput measurements have been detected and entered into a respective MPTCP connection state record 89, a traffic shaping determination function 99 processes the sub-flow throughput data to determine a measured ratio of distribution between the LTE flow and the WiFi flow, in this case, $R_{measured}$ relates to a ratio of the WiFi throughput over the total data throughput (WiFi and LTE combined) for a MPTCP connection. This ratio, $R_{measured}$ is also stored in the WiFi+LTE throughput information variable 95 of the MPTCP connection state record 89.

The network performance monitor 83 continuously collects system measurements for the LTE radio access status, WiFi radio access status and core network radio status for the MPTCP connection and updates the WiFi/LTE throughput information 95 at periodic intervals once a sufficient amount of data has been collected.

The traffic shaping determination function then uses the calculated ratio and information in the configuration file 85 containing a desired ratio to calculate how to modify the current MPTCP sub-flows.

The configuration file also contains a number of generally static variables such as LTE core transit costs 101, WiFi core transit costs 103, device power consumption factors 105, target IP flow distributions 107 and traffic distribution algorithms 109.

In this embodiment, the target IP flow distributions 107 section of the configuration file contains a set of distribution target ratios, $R_{target}$ that can be applied to the MPTCP connections. In this case, each target relates to a ratio of the WiFi throughput over the total data throughput (WiFi and LTE combined) for a MPTCP connection.

Target Ratio=1—all traffic for the MPTCP connection should travel over WiFi
Target Ratio=0—all traffic for the MPTCP connection should travel over LTE
Target Ratio=0.5—equal distribution of WiFi and LTE traffic
Target ratio=0.8-80% of the MPTCP traffic over WiFi and 20% over LTE.

The traffic shaping determination function 99 selects a target ratio, $R_{target}$ from the target IP flow distributions 107 to be applied to the MPTCP flow and then compares the target against the measured ratio, $R_{measured}$ to determine a difference $R_{error}$ between the target throughput ratio and the measured throughput ratio for the MPTCP connection between the mobile device 5 and the correspondent node 19.

In this embodiment, a positive value for $R_{error}$ indicates that more traffic needs to be sent to via the WiFi path, while a negative value of $R_{error}$ indications that more traffic needs to be sent via the LTE path.

The traffic shaping determination function 99 of the monitor 73 is therefore responsible for determining the degree of divergence between a desired ratio of data distribution between sub-flows in a MPTCP connection and the actual current ratio of data distribution.

Control

Once the degree of divergence $R_{error}$ has been calculated, the monitor function 73 signals the controller 75 to actually implement the changes to the packet flows. The location of the MPTCP state information record 89 for the MPTCP connection is passed to the controller along with the $R_{error}$ calculated for the MPTCP connection by the traffic shaping determination function 99.

Figure 9:
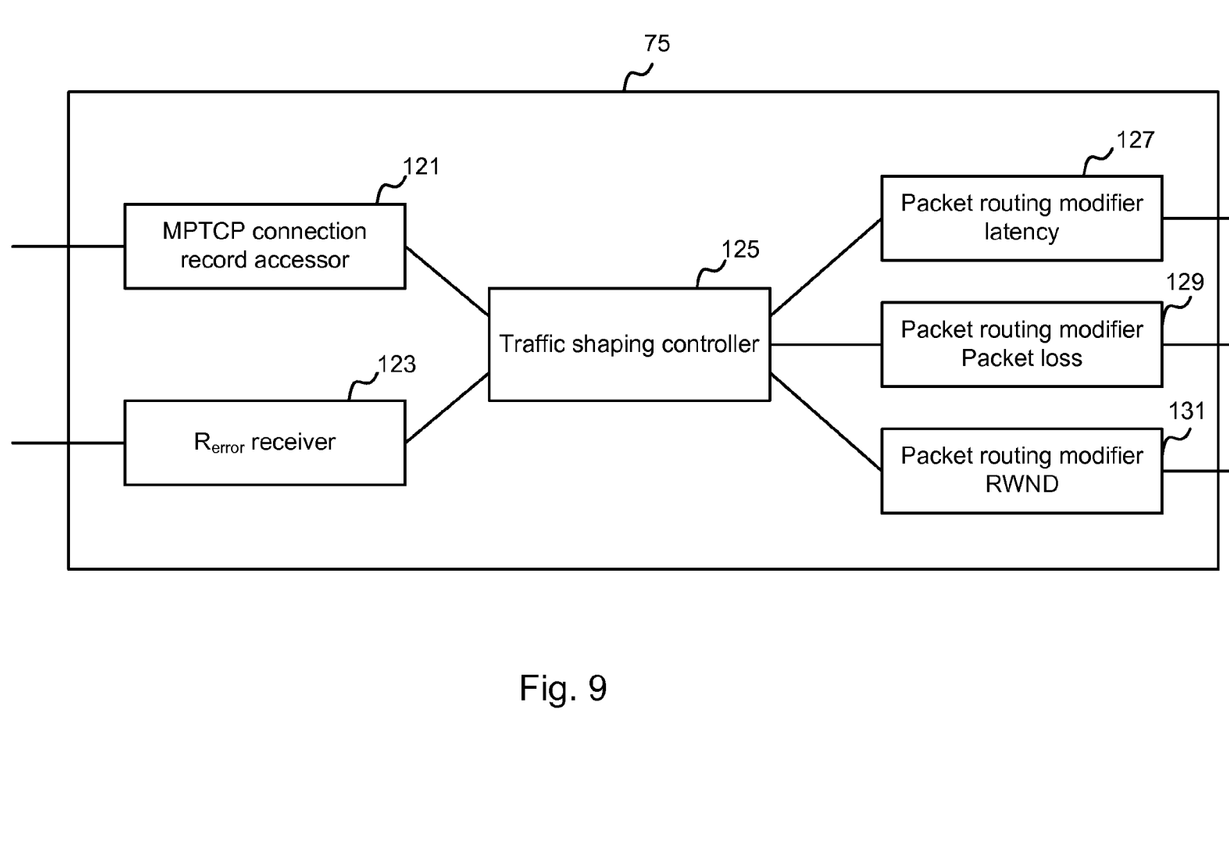
FIG. 9 is a schematic showing the functional components of a controller of the multi-path distribution control function.

FIG. 9 shows the functional components of the controller 75. The controller 75 contains a MPTCP connection record accessor 121, a $R_{error}$ receiver 123, a traffic shaping controller 125, and a set of packet routing modifiers for: latency 127, packet loss 129 and receiver window 131.

The controller 75, uses a-priori knowledge of how MPTCP scheduling on the mobile device will react to packet loss, RTT latency changes or TCP window sizes on the TCP sub flows.

The $R_{error}$ receiver 123 is connected to the traffic shaping determining function 99 of the monitor 73. When a new $R_{error}$ value is received for the MPTCP connection, the address of the corresponding MPTCP connection record 89 is also provided so that the MPTCP connection record accessor 121 can access the MPTCP connection record 89 relating to the MPTCP connection.

Using the $R_{error}$ value, the traffic shaping controller 125 can calculate a control parameter $C_{out}$ to modify the properties of the packet sub-flows in the MPTCP connection, so that the standard MPTCP function of the MPTCP stack 35 on the mobile device 5 will alter the allocation of packets to the LTE send buffer 39 and WiFi send buffer 41 in order to reduce the value of $R_{error}$ so that the $R_{measured}$ value is closer to the $R_{target}$ value.

In this embodiment, when the $R_{error}$ value is positive, then more data should be sent via the WiFi path and therefore the traffic shaping controller 125 applies traffic shaping to the LTE sub-flow so that standard MPTCP behavior at the stack 35 will regard the line conditions of the LTE path to have deteriorated and therefore will reconfigure itself to send more data via the WiFi path.

Conversely, when the $R_{error}$ value is negative, then more data should be sent via the LTE path and therefore the traffic shaping controller 125 applies traffic shaping to the WiFi sub-flow so that standard MPTCP behavior at the stack 35 will regard the line conditions of the WiFi path to have deteriorated and therefore will reconfigure itself to send more data via the LTE path.

In particular, the $C_{out}$ value is used to cause traffic shaping by altering three packet flow attributes, namely:
  introduce packet loss;
  increase RTT latency; or modify the Windows Size TCP option in particular IP Flows depending on the MPTCP sub-flow and path.

The traffic shaping controller 125 therefore generates $C_{out}$ and sends a sub-parameter to each of the packet routing modifiers 127, 129, 131, namely:
  $C_{out-latency}$ is sent to the packet routing modifier for latency 127;
  $C_{out-packetloss}$ is sent to the packet routing modifier for packet loss 129; and
  $C_{out-rwnd}$ is sent to the packet routing modifier for RWND 131.

Increasing Latency

In TCP, packets sent by a sender are acknowledged, using ACK messages including the sequence number of the transmitted packet. Since the transmission time of the sent packet, and the reception time of the corresponding ACK is known, the MPTCP stack 35 of the mobile device can determine a packet round trip time (RTT) of each packet in the sub-flow. The RTT is an indication of the state of the network link (speed, congestion) and is therefore used as a factor in the sub-flow selection to determine how many packets are sent via LTE path and how many are sent in the WiFi path. If the RTT increases for one of the sub-flows, it will be selected less often versus a sub-flow having a lower RTT.

Figure 10:
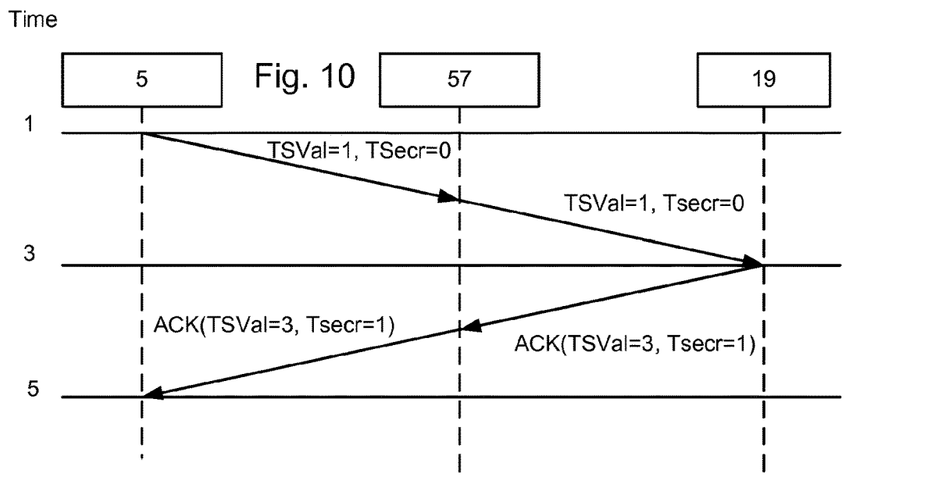
FIG. 10 shows a message flow of a data packet and corresponding ACK packet from a sender to a receiver.
Figure 11:
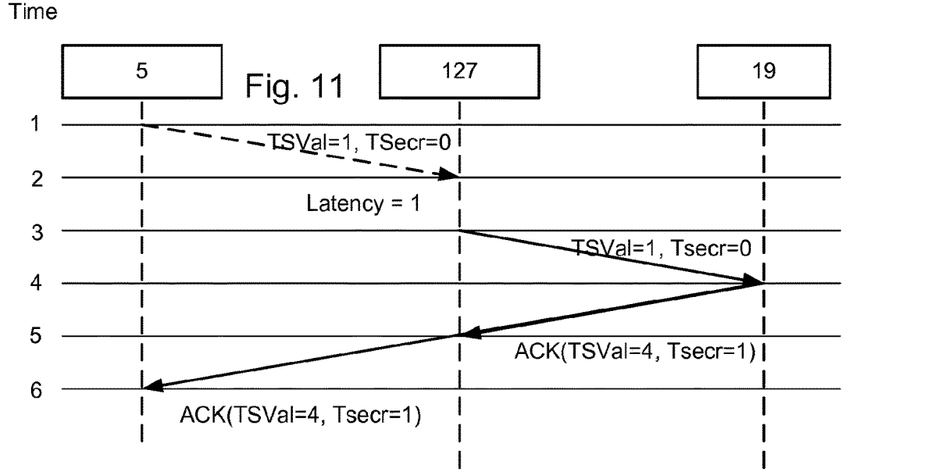
FIG. 11 shows the effect of the hub delaying a packet to modify the latency of a data packet flow.
Figure 12:
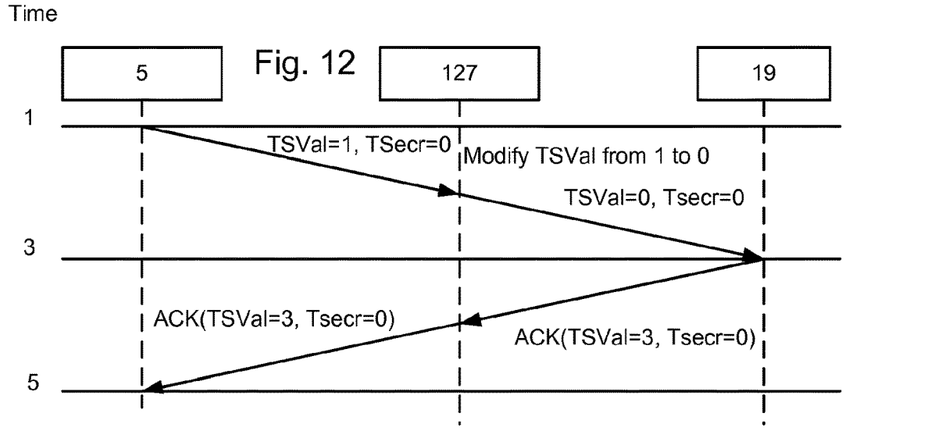
FIG. 12 shows the effect of the hub changing a TSVal value to modify the reported latency of a data packet flow.

FIGS. 10 to 12 show how the latency is manipulated by the packet routing modifier for latency 127. In particular, since TCP relies on the Timestamp Value (TSval) and Timestamp Echo Reply (TSecr) values in the packets to determine RTT, the packet routing modifier for latency 127 is configured to modify those values in two ways in this embodiment.

In FIG. 10, a packet is transmitted from the mobile device 5 to the correspondent node 19 along the LTE path via the hub 7 without any processing by the MDCF 59. The packet has a TSval of 1 and a TSecr value of 0. The hub 7 forwards the packet which is received by the correspondent node 19. An ACK packet is sent back having a TSval of 3 and a TSecr of 1. When this packet is received at the mobile device at TSVal 5, it calculates an RTT of 5-1 which is 4 time units.

FIG. 11 shows the processing of the packet routing modifier for latency 127 in introducing a real delay to the packet before forwarding to the correspondent node.

When the packet is received by the hub 7, the packet is identified as being part of a MPTCP sub-flow which requires modification, and the routing modifier for latency 127 controls the packet routing function 57 to delay packets from leaving the hub 7 for a period of time. In FIG. 10, the transmitted packet is delayed by a time unit so that it arrives later and the ACK is sent with a TSval of 4. When this packet is received by the mobile device at TSval 6, the RTT will be calculated as RTT=6-1=5. Therefore the quality of the LTE path will be regarded as having deteriorated which will cause the MPTCP stack to send more packets via the WiFi path.

FIG. 12 shows the processing of the packet routing modifier for latency 127 in modifying the TCP TSval and/TSecr values in the packet before forwarding to the correspondent node.

When the packet is received by the hub 7, the packet is identified as being part of a MPTCP sub-flow which requires modification, and the routing modifier for latency 127 controls the packet routing function 57 so that packets are not actually delayed, but the TSval of the transmitted packet is changed to a lower value corresponding to an earlier transmission time. When this packet is received by the mobile device at TSval 5, the RTT will be calculated as RTT=5-0=5. Therefore the quality of the LTE path will be regarded as having deteriorated which will cause the MPTCP stack to send more packets via the WiFi path.

Acknowledging each packet results in a lot of control data being sent over a TCP flow, however sending a large number of packets before requiring an acknowledgement can result in many packets being unnecessarily retransmitted if a packet is lost early in the transmission cycle.

To strike a balance between improving throughput and resilience to packet loss, a TCP session is limited by two windows: the congestion windows (CWND) and the receiver windows (RWND). The congestion window tries not to exceed the capacity of the network and the receive windows tries not to exceed the capacity of the receiver to process data. In TCP, the sender uses the minimum or either the receiver window size and the congestion window to calculate the maximum amount of packets that can be reliably sent without an acknowledgement packet.

Packet Loss

Figure 13:
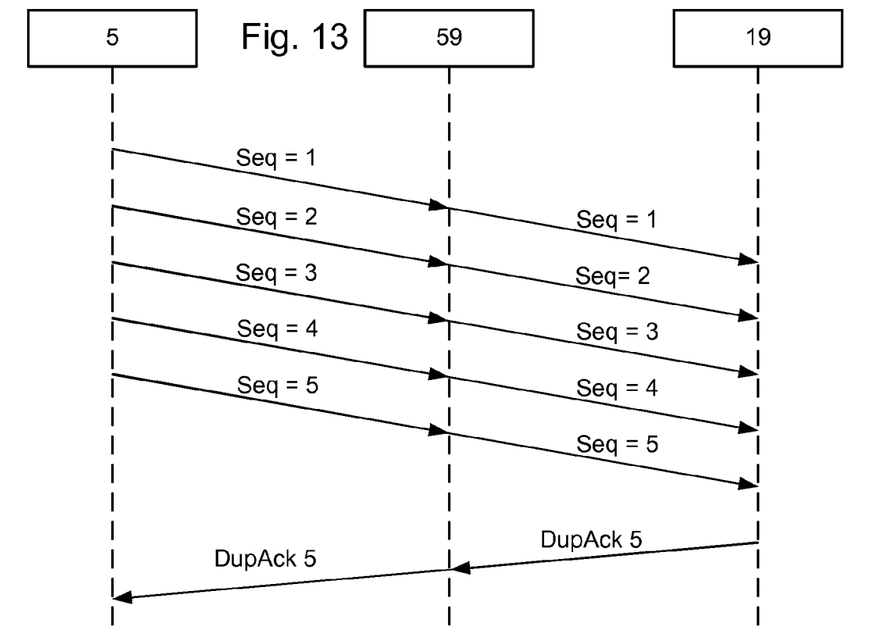
FIG. 13 shows a sequence of data packets from a sender to a receiver with a single ACK for the whole sequence.
Figure 14:
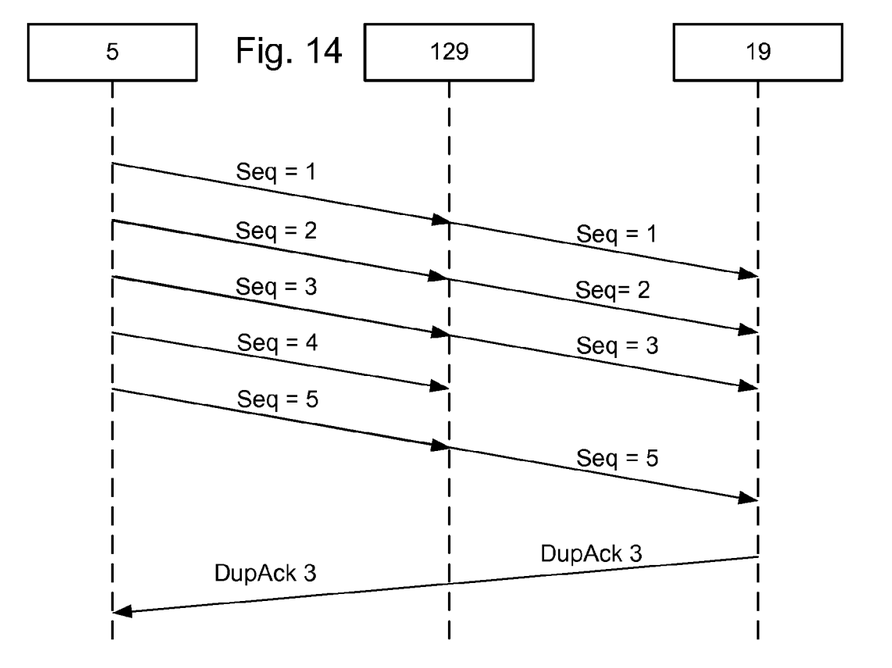
FIG. 14 shows the hub introducing packet loss to the transmission of data packets.

FIGS. 13 and 14 show the processing of the packet routing modifier for packet loss 129.

In FIG. 13, the mobile device 5 sends a sequence of 5 packets on the LTE path to the correspondent node via the hub 7. Instead of acknowledging each packet as it arrives, the correspondent node 19 sends an ACK packet containing the sequence number of the last successfully received packet, in this case packet 5.

Introducing packet loss on a sub-flow will cause a decrease in the congestion window because it is indicative of a more unreliable network path. In FIG. 14, the packet routing modifier for packet loss 129 is used to block a proportion of the sent packets, in this case packet 4 is blocked, so that even if packet 5 is allowed to progress to the correspondent node 19, only packet 3 will be acknowledged. Therefore the congestion window for the LTE path will be reduced and so MPTCP will regard it as a more unreliable link and more traffic will be directed to the WiFI link.

Window Size

Figure 15:
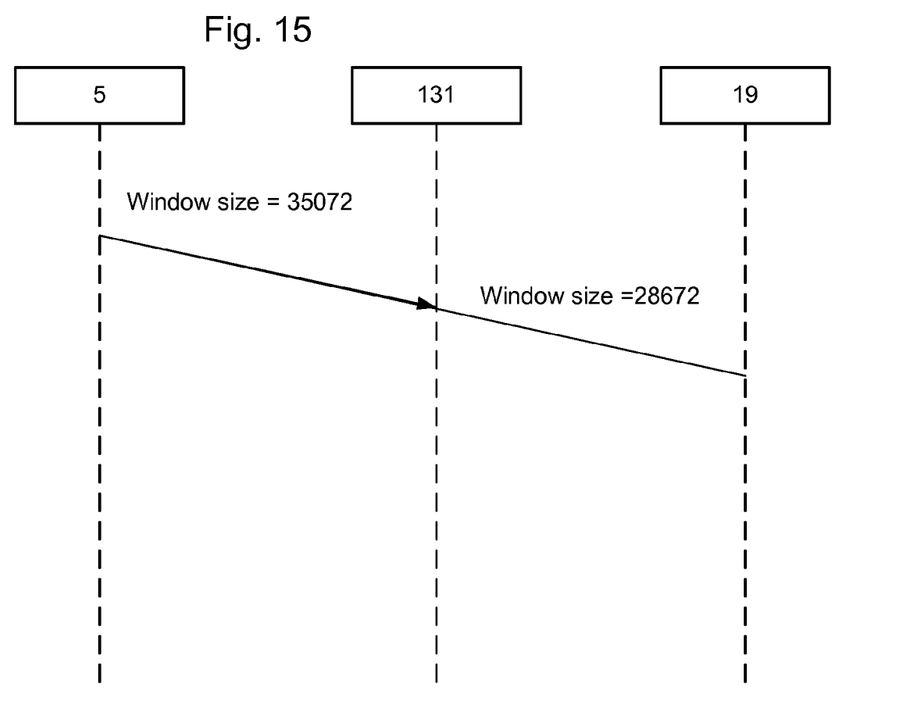
FIG. 15 shows the hub modifying the reported window size of packets sent from a sender to the receiver.

FIG. 15 shows the processing of the packet routing modifier for RWND 131.

The window size is used by TCP for flow control. TCP packets sent from the mobile device to the correspondent node contain a receive window size RWND value which is the maximum number of bytes of data the mobile device can accept. Once the correspondent node 19 has transmitted the maximum data defined in RWND, it will stop until the sent data is acknowledged. The value in the packets is 35072 bytes for a packet on the LTE path.

Therefore, in this embodiment, the packet routing modifier for RWND 131 reduces the stated window size field in any packets transmitted from the mobile device 5 to the correspondent node 19. In FIG. 15 the window size is reduced to 28672.

This causes the MPTCP stack to determine that the LTE path has a lower capacity and therefore more data will be sent over the WiFi path.

With the above modifications to the MPTCP packet flows, the throughput of one or both of the paths will change, and the network performance monitor 83 will determine a new value of $R_{measured}$. The new value will cause a new value for $R_{error}$ and $C_{out}$.

The above processing repeats in accordance with the negative feedback loop such that the $R_{measured}$ value tends towards the $R_{target}$ value and therefore $R_{error}$ tends to 0.

Multiple Flows

In the above description, for ease of explanation, the processing of the monitor 73 and controller 75 in the MDCF 59 is described in relation to a single MPTCP flow from the mobile device 5 to the correspondent node 19, which is considered to be the upstream direction.

The MDCF 59 is actually configured to process all MPTCP flows and sub-flows flowing between plural applications of the mobile device 5 and the correspondent node in both the upstream and downstream direction, and also for any other local devices connected to the hub 7 having WiFi and LTE connectivity.

For each MPTCP connection, the MPTCP detector 81 creates a new record 89 in the MPTCP state information store 87 and thereafter each separate MPTCP connection is processed by the traffic shaping determination function 99 in the upstream and downstream direction to calculate a target ratio $R_{targetUP}$ and $R_{targetdown}$. An example table showing target information for a set of local devices is shown below. In this embodiment, a ratio value of −1 is used to indicate that traffic shaping is disabled.

| $\{R_{targetN-up},$ $R_{targetN-down}\}$ | IP Flow | Description |
|---|---|---|
| {1, 1} | 192.168.3.4:2001 | For any MPTCP connection that connects to a network host address: port of 192.168.3.4:2001, send all data (upstream and downstream) over the WiFi path |
| {−1:0} | 192.168.6.4 | For any MPTCP connection that connects to network host address of 192.168.6.4 (any port) send all downstream data over the LTE path and do not implement any traffic shaping on the upstream. |
| {0.8, 0.8} | 192.168.0.0/16 | For any MPTCP connection that connects to network subset of 192.168.0.0/24, send 80% of data (upstream/downstream) over the WiFi path |
| (−1, −1} | * | For any MPTCP connections that do not match any of the IP flow rules defined above, do not implement traffic shaping for upstream or downstream (i.e. default normal MPTCP behavior). |

In the embodiment, a MPDF 59 is described having a monitor and controller for monitoring and modifying the properties of MPTCP flows between a sender and a receiver in the upstream and downstream direction so as to manipulate MPTCP to meet a particular distribution ratio. A particular advantage of the DPCF is that the modifications are transparent to both MPTCP stacks and no modifications are required to the device MPTCP stacks.

ALTERNATIVES AND MODIFICATIONS

In the embodiment, the MDCF 59 is a function of the hub 7 because it is a common point in the flow of packets in the LTE path and WiFi path. In an alternative, the MDCF is located at the ISP core 15 which is also a common point in the flow of packets. Although a MDCF within the ISP core 15 will require a more complex MPTCP detector to accommodate a greater number of possible MPTCP flows from numerous hubs, more processing power and hardware can be available. Furthermore it is possible to manipulate the total traffic sent to the cellular network core when required.

In the embodiment, the mobile device uses WiFi and LTE wireless data connections to connect to the hub and the data flows are transferred via the hub to the ISP core before delivery to the correspondent node. Due to the small cell configuration for LTE, the LTE data further traverses the LTE core. Whilst the LTE small cell path is always present in the embodiments, in a modification, other data paths from the hub are available for use by MPTCP and the distribution of data can be controlled by the MDCF. In addition to WiFi, other common hub interfaces for connectivity to local devices, such as wired Ethernet and wireless Bluetooth are used.

The invention claimed is:

1. A method of controlling data packet transmission from a sender device to a receiver via a plurality of data paths in accordance with a multi-path data transmission protocol, the method comprising:

by a device, connected to the sender device and located on a common part of a data network carrying the plurality of data paths between the sender device and the receiver, carrying out the following:

identifying a set of data sub-flows belonging to a data packet transmission session between the sender device and the receiver, each sub-flow travelling via a different one of the plurality of data paths and comprising a proportion of data packets distributed in accordance with the multi-path data transmission protocol;

monitoring characteristics of the set of data sub-flows to the receiver to determine whether the proportion of data packets on each data path meets a predetermined target distribution different from the distribution in accordance with the multi-path data transmission protocol;

modifying transmission properties of the data packets in the set of data sub-flows so that a proportion of data packets flowing across each of the plurality of data paths meets the predetermined target distribution; and sending data packets via the plurality of data paths in accordance with the multi-path data transmission protocol, the multi-path data transmission protocol operating on the basis of the modified transmission properties.

2. The method according to claim 1, further comprising a cellular base station device arranged to provide cellular data connectivity to the sender device and to tunnel the data packets to a cellular network core, wherein at least one of the plurality of data paths is a cellular data connection, and at least one other of the plurality of data paths includes a wireless network connection.

3. The method according to claim 1, wherein a ratio of data transmitted in each data path is measured.

4. The method according to claim 1, wherein the modifying comprises changing at least one of a packet loss, latency or transmission window size characteristic reported to a multi-path data transmission protocol.

5. An apparatus for controlling data packet transmission from a sender device to a receiver via a plurality of data paths in accordance with a multi-path data transmission protocol, the apparatus being located on a common part of a data network carrying the plurality of data paths between the sender device and the receiver, comprising:
   a processor configured to:
      identify a set of data sub-flows belonging to a data packet transmission session between the sender device and the receiver, each sub flow travelling via a different one of the plurality of data paths and comprising a proportion of data packets distributed in accordance with the multi-path data transmission protocol, and
      monitor characteristics of the data sub-flows to the receiver to determine whether the proportion of data packets on each data path meets a predetermined target distribution different from the distribution in accordance with the multi-path data transmission protocol; and
   a controller configured to modify transmission properties of the data packets in the sub-flows so that a proportion of data packets flowing across each of the plurality of data paths meets the predetermined target distribution; and
   a transmitter configured to send data packets via the plurality of data paths in accordance with the multi-path data transmission protocol, the multi-path data transmission protocol operating on the basis of the modified transmission properties.

6. The apparatus according to claim 5, further comprising a short range cellular base station device arranged to provide cellular data connectivity to the sender device and to tunnel the data packets to a cellular network core, wherein at least one of the data paths is a cellular data connection, and at least one other of the data paths is a wireless network connection.

7. The apparatus according to claim 5, wherein a ratio of data transmitted in each data path is measured.

8. The apparatus according to claim 5, wherein the controller is configured to change at least one of a packet loss, latency or transmission window size characteristic of data packets within the set of sub-flows reported to the multi-path data transmission protocol.

9. A non-transitory computer-readable storage medium storing a computer program product containing processor executable instructions for causing a computer processor to carry out the method according to claim 1.

* * * * *